May 18, 1965 R. P. FOX 3,184,006
CAM-ACTUATED BAND BRAKE
Filed Dec. 28, 1961 2 Sheets-Sheet 2
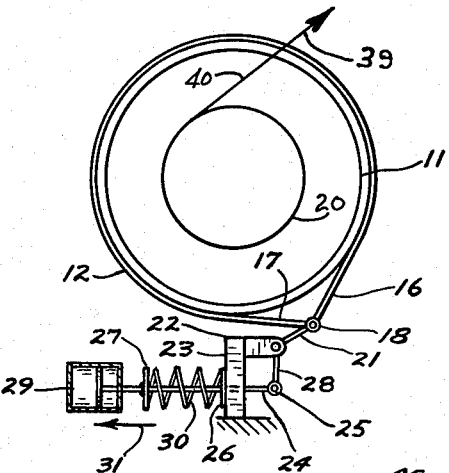
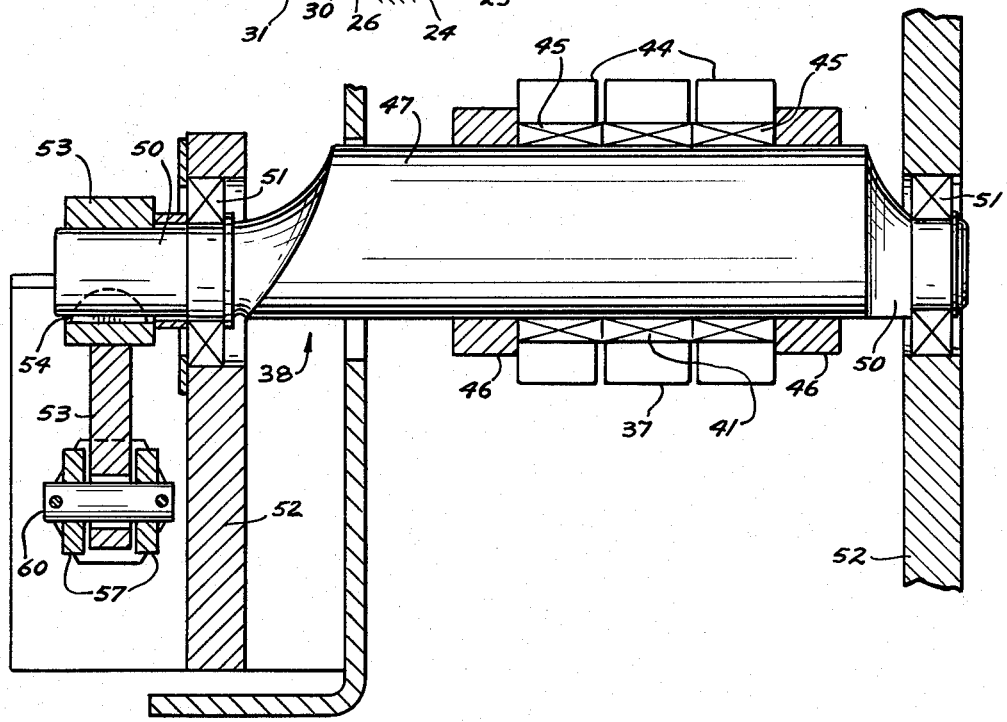
INVENTOR.
ROBERT P. FOX
BY
Braddock and Braddock
ATTORNEYS

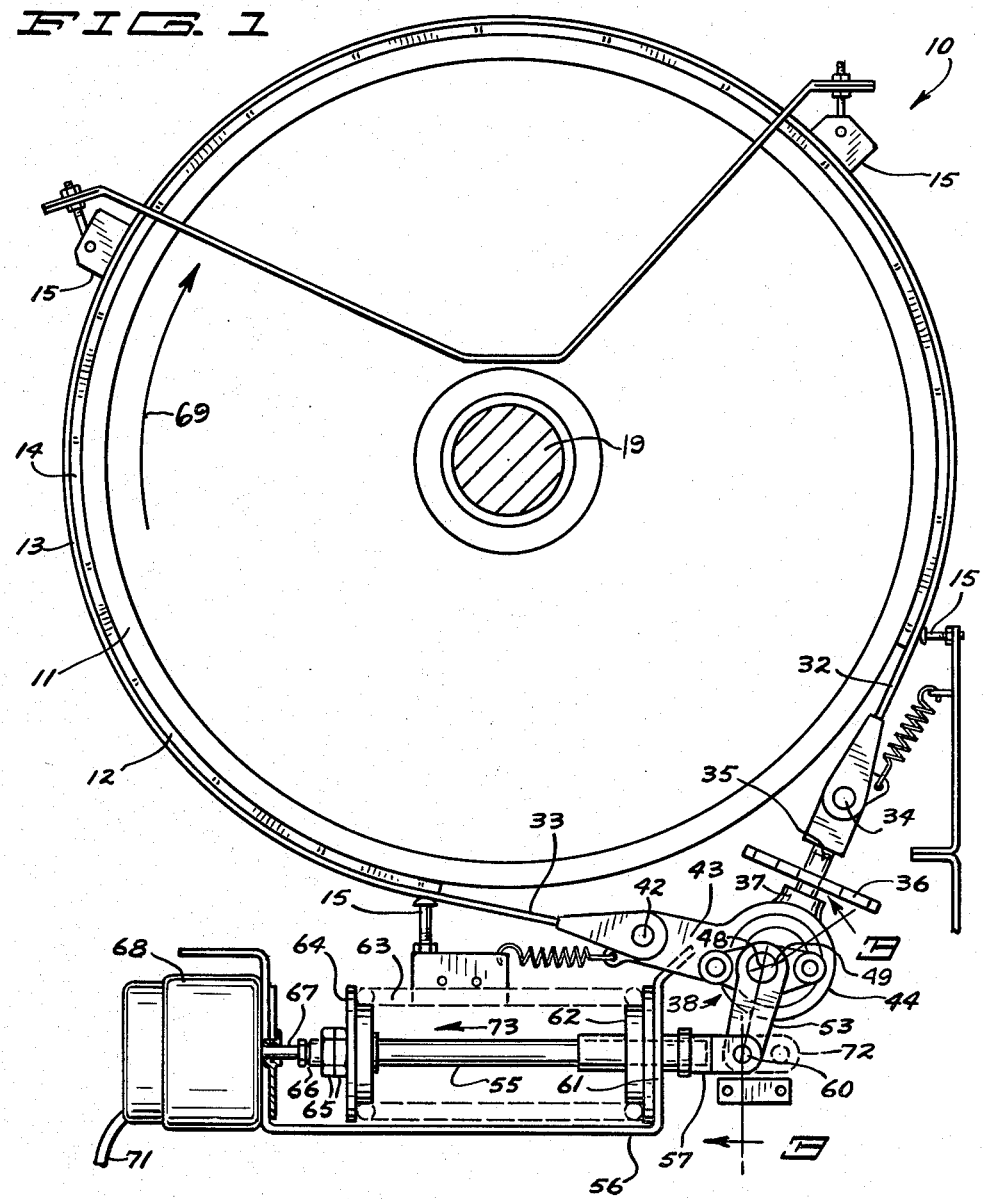

3,184,006
CAM-ACTUATED BAND BRAKE
Robert P. Fox, St. Paul, Minn., assignor to American Hoist & Derrick Company, St. Paul, Minn., a corporation of Delaware
Filed Dec. 28, 1961, Ser. No. 162,671
2 Claims. (Cl. 188—77)

The present invention has relation to actuating mechanism for brakes and more particularly to a mechanism which is used on an external brake band, which mechanism when actuated transmits force to opposite ends of the brake band simultaneously.

With conventional external brake bands, one end of the band is deadended by attaching it with respect to a member stationary with respect to the mounting for the brake drum and the other end of the band is actuated by exerting a pull or force thereon. The braking force at the rim of the brake is determined by the difference between the dead end load and the actuated end load, which, in a rotating drum, is a function of the frictional characteristics of the brake band and drum, the amount of band contacting the drum, and the force applied at the live end.

Under extremely high operating temperatures the dead end load on conventional brake bands reduces significantly due to reduced friction between the band and the drum and the brake capacity drops. The only practical way to increase the braking effort is to greatly increase the live or actuated end load. In many systems, the live end load is a relatively fixed load applied with spring pressure. Thus it becomes difficult, if not impossible, to increase the live end load sufficiently to compensate for the reduced coefficient of friction between the brake band and the drum, and the brake becomes inoperative. This is commonly called brake "fade."

In a brake actuating mechanism made according to the present invention the total force applied to the brake is predetermined, as both ends of the brake band are actuated by a common member. The braking effort, which is determined by the differential in load between the "dead" or high load end and the live, or low load end, is automatically compensated if there is a reduction in the load on either the "low" or "high" load ends of the brake band. The effective force transmitted by the actuating member to the respective ends of the brake band can be determined by the effective lever arm by which the force is applied by the common member to the respective brake band ends.

It is an object of the present invention to present brake actuating mechanism which provides stable operation of external type brakes.

In the drawings,

FIG. 1 is a side elevational view of an external brake drum and band having actuating mechanism made according to the present invention;

FIG. 2 is a schematic representation of the brake and actuating mechanism of FIG. 1; and FIG 3 is a fragmentary enlarged sectional view taken as on line 3—3 in FIG. 1.

Referring to the drawings and numerals of reference thereon, an external brake assembly 10, includes a drum 11, which is part of a winch spool 20 rotatably mounted on a shaft or axle 19. When the spool and drum are not being driven, load on a cable 40 mounted on the winch spool 20 exerts, a rotational force tending to rotate the drum 11 in direction as indicated by arrow 69. An external brake band assembly 12 is mounted over the outer peripheral surface of drum 11 and may be actuated to resist the rotational force from the cable 40 to stop the drum from rotating.

The band assembly 12 consists of an outer metal strip 13 and inner brake lining 14 which is positioned to engage an outer surface of the brake drum 11. A plurality of guides 15 are positioned around the periphery of the brake and serve to keep the bake lining adjacent the drum and also to insure maximum contact of the band and drum when the brake is actuated.

Referring specifically to the schematic representation in FIG. 2, a "live" or low load end portion 16 of the band 12 and a "dead" or high load end portion 17 are pivoted, as at 18, to a bell crank 21 that in turn is pivotally mounted as at 22 to a support 23 which is fixedly attached to a supporting surface. A link 24 is pivotally mounted, as at 25, to an actuating arm 28 of the bell crank 21. Link 24 passes through a fixed support member 26 and also has a stop block 27 fixedly attached thereto on the opposite side of the support member 26 from the arm 28. A spring 30 is positioned between the stop block 27 and the support member 26 and resiliently urges the link in direction as indicated by arrow 31. The link 24 is operatively associated with an air cylinder 29 which is selectively operative to overcome the normal resistance of the spring and release the resilient load on the bell crank 21 and consequently the load on the brake band 12. The cable 40 is loaded in direction indicated by arrow 39. This force tends to rotate the brake drum and is resisted by the braking effort.

As can be seen in the schematic diagram, the load applied by the spring 30 is transferred to both of the ends 16 and 17 of the brake band 12. It can also be seen most clearly in the schematic diagram that the force exerted by the spring 30 will be transmitted to the ends 16 and 17 of the brake band 12 in different magnitudes. For example, the portion of the total load exerted on end 16 is much less than on the end 17 when the drum is rotating under load exerted in direction of arrow 39.

Referring to FIGS. 1 and 3, a specific embodiment of the actuating mechanism is illustrated. The brake band 12 has a low load end 32 and a high load end 33. The low load end 32 is attached as at 34 to a pull link 35 which in turn has an adjusting mechanism 36 and an integral head ring or member 37 which is rotatably mounted on a shaft 47 of a bell crank assembly 38. The head member 37 has a bushing 41 that rides on the shaft 47.

The high load end 33 is pivotally mounted as at 42 to a link 43 that has a bifurcated head member 44 which is rotatably mounted on cam shaft 47. One element of the bifurcated member is positioned on each side of the head member 37 for the low load end 32 of the brake band. The head members 44 has bushings 45 which ride on the cam shaft 47. The head members 44 and 37 are held in position along the cam shaft 47 with releasable collars 46, 46.

The shaft 47 of bell crank assembly 38 has integral eccentric opposite end members 50, 50 each of which is rotatably mounted in a separate bearing 51 and are movable about a common axis 48. Axis 48 is offset from the center line or axis 49 of shaft 47. The bearings 51 in turn are mounted on suitable supports 52, 52. The supports 52, 52 are integral with a machine on which the brake drum is operating. An actuating lever 53 is drivably mounted to one of the eccentric end members 50 with a key 54.

A link 55 is slidably mounted with respect to a bracket 56 and has an adjustable clevis 57 threadably attached adjacent one end thereof. The clevis is pivotally attached as at 60 to actuating lever 53. The actuating lever 53 and the cam shaft 47 which forms bell crank assembly 38, acts as the bell crank 21 shown in the schematic diagram 2. Bracket 56 has an upstanding wall 61 through which link 55 is slidably mounted. A first guide 62 is slidably mounted over link 55 and butted against the end wall 61. A spring 63 is positioned over first guide 62 and extends along link 55. A second guide 64 is positioned on link 55 and held in place with a pair of lock nuts 65, 65.

Link 55 is attached, as at 66, to a piston rod 67 extending from an air actuated cylinder 68. The piston rod 67 is attached to an internal piston (not shown). The cylinder 68 is connected through conduit 71 to a source of air pressure. When air under pressure is introduced into cylinder 68 the piston and rod assembly 67 will move and the link 55 will therefore move against the force of spring 63 to position as indicated by dotted lines at 72. The normal force of spring 63 is in direction as indicated by arrow 73 and normally urges the brake band to tighten onto the brake drum.

The cam shaft 47 is made so that the center line 49 thereof is offset from the center lines 48 of eccentric end members 50. Thus, as the lever 53 is moved or a force is exerted on the lever by spring 63 a moment is created about the pivotal axis 48 of the end members 50. This moment in turn provides a force which is transmitted to the end assemblies of brake band 12 and applies a force to move the brake band lining against the brake drum. With the drum rotating in direction as indicated by arrow 69 in FIG. 1, the torque on the drum will act to make the loading on the two ends of the brake band different in magnitude. This, as explained previously, is due to the friction between the band lining and drum and results in a braking force or effort at the rim of the brake drum. As shown, the force exerted by the spring 63 acting through the provided linkage will be sufficient to balance the total necessary force on the brake band ends.

Operation

The load at the high load end 33 of the brake band is a function of the low end load, the brake band lining coefficient of friction with relation to the brake drum, and the amount of band contacting the drum. During operation, when high temperatures cause a reduction in the coefficient of friction between the brake band lining and the rotating brake drum, the load at the high load end 33 will reduce. In the conventional brake, where the high load end of the band is fixed or stationary, and the force exerted on the low load end remains constant, a reduction in friction between the band and the drum results in a great decrease in load at the high load end. Thus the tangential force at the rim of the brake drum or, in other words, the braking effort, which is the difference in load between the high load end and the low load end, drops.

In brake mechanism for hoisting drums, this results in a very marked reduction in braking effort and the load on the hoist cable may be released. Brake failure due to this "fade" is highly dangerous and causes innumerable problems.

In the brake actuating mechanism made according to the present invention, both ends receive a portion of the load exerted by a spring actuator through the provided linkage, and this spring load remains fairly constant. The load at each end of the brake band is proportional to the total load exerted by the linkage and depends upon the geometry of the system, or, in other words, the relative position of the actuating mechanism with respect to the brake band ends. Any change in load at the high load end of the brake band in the mechanism made according to the present invention results in a compensating change of load at the low load end because the total load, which, as stated previously, is exerted by a spring through suitable mechanism, remains constant.

Thus, for example, a drop in the load at the high load end of the brake band would result in a compensating increase of load at the low load end. This in turn would tend to clamp the brake band more tightly against the rotating drum and consequently, increase the frictional force between the drum and the band. This increase in friction between the band and the rotating drum will again raise the high load end load to a point where the differential between the loads at the high load end and the low load end, which is the force at the rim of the brake drum tending to prevent the drum from rotating, assumes a new equilibrium point.

This compensating effect of load transfer gives a more stable braking effort for any change in the frictional characteristics of the band.

If the coefficient of friction between the band and the drum drops, even in a brake made according to the present invention the brake will not return to its original capability without an increase in the actuating force exerted on the band. However, the braking effort will not drop as significantly in a brake made according to the present invention, because of the compensating effects of transfer of load from the high load end to the low load end when fade occurs, as it does in a conventional brake system. Also, the additional effort required by the actuating mechanism necessary to restore the brake to its original capabilities or braking effort is not as great, proportionally, in a brake made according to the present invention as it is in a conventional type brake.

The same compensating effect in a brake made according to the present invention, is effective to reduce the tendencies of brakes to self-energize. For example, if a brake made according to the present invention tends to self-energize, the load at the high load end will rise. This will cause a reduction in the load on the low load end of the brake band because, as stated previously, the total actuating force exerted by the actuating mechanism will remain relatively constant. The drop of load at the low load end will relieve some of the actuating pressure of the band from the drum and will tend to release the brake and compensate for the self-energizing characteristics. The brake forces will of course tend to resume an equilibrium which will be substantially the same as before.

With the bell crank assembly positioned as shown, wear on the brake band will cause the spring 63 to extend and reduce its available effort. This reduction in available effort caused by extension of the spring will be compensated for by the fact that the effective lever arms to the ends of the brake bands will change. For example, the effective lever arm acting on the high load end of the brake band will shorten and the effective lever arm exerting a force on the actuating end of the brake band will lengthen. Even though the spring 63 will extend more so that the effort exerted by the spring will be reduced, the differential between the loads at the low load end and the high load end of the brake band will remain substantially constant because less load will be provided at the low load end and relatively more load will be applied at the high load end.

The brake, as shown, is a normally energized brake with an air pressure release. When the cylinder 68 is pressurized, line 55 moves to position as indicated in dotted lines at 72 in FIG. 1. The bell crank assembly moves to relieve the load on both the ends of the brake band and no frictional force will be exerted between the band and the drum.

What is claimed is:

1. The combination with a rotatable brake drum and a continuous brake band substantially encircling said drum, said brake band having first and second ends, of:

a brake actuating mechanism including a cam shaft having integral end portions pivotally mounted on a first axis independent of and adjacent said drum, said axis being fixed with respect to said drum, said first and second ends of said brake band being rotatably mounted on said cam shaft about a common second axis parallel to and spaced from said first axis, a lever integral with said cam shaft and extending outwardly from said first axis, and spring means for exerting force on one end of said lever thereby to rotate said cam shaft to position to tend to simultaneously clamp both ends of said brake band down onto said brake drum said cam shaft being the sole means for restraining the band from rotating with the drum when said band and drum are engaged.

2. The combination as specified in claim 1 wherein said cam shaft is positioned with respect to the axis of rotation of said brake drum and with respect to the ends of said brake band so that the amount of load transferred to each of the ends of said drum is different.

References Cited by the Examiner

UNITED STATES PATENTS

| | | | |
|---|---|---|---|
| 789,910 | 5/05 | Hill | 188—77 |
| 1,297,531 | 3/19 | Ahlgren | 188—77 |
| 2,291,816 | 8/42 | Lear | 188—77 |
| 2,705,059 | 3/55 | Wilkinson | 188—77 |
| 2,955,680 | 10/60 | Caero | 188—77 |

FOREIGN PATENTS

| | | |
|---|---|---|
| 173,804 | 10/05 | Germany. |
| 512,985 | 11/30 | Germany. |

ARTHUR L. LA POINT, *Primary Examiner.*

T. GRAHAM CRAVER, RALPH D. BLAKESLEE, *Examiners.*